United States Patent [19]

Persson et al.

[11] Patent Number: 5,139,131
[45] Date of Patent: Aug. 18, 1992

[54] CONVEYOR INSTALLATION FOR WORKPIECE CARRIERS

[75] Inventors: Anders Persson, Lund; Leif Pettersson, Griesheim, both of Sweden

[73] Assignee: Tetra Pak Holdings S.A., Pully, Switzerland

[21] Appl. No.: 732,073

[22] Filed: Jul. 18, 1991

[30] Foreign Application Priority Data

Sep. 26, 1990 [DE] Fed. Rep. of Germany ....... 4030362

[51] Int. Cl.$^5$ ............................................. B65G 37/00
[52] U.S. Cl. .............................. 198/346.1; 198/465.1; 198/795; 198/803.01
[58] Field of Search ................ 198/795, 465.1, 803.01, 198/346.1

[56] References Cited

U.S. PATENT DOCUMENTS

| | | | |
|---|---|---|---|
| 2,519,179 | 8/1950 | Duncan | 198/795 X |
| 3,630,502 | 12/1971 | Schmidt | 198/465.1 |
| 4,751,998 | 6/1988 | Yano | 198/465.1 |

FOREIGN PATENT DOCUMENTS

0580151 11/1971 U.S.S.R. ............................. 198/795

Primary Examiner—Robert P. Olszewski
Assistant Examiner—Cheryl L. Gastineau
Attorney, Agent, or Firm—Paul & Paul

[57] ABSTRACT

A conveyor installation has a track (3) driven to run endlessly about two deflector wheels (100, 101) and supported by guide rails (1, 1', 2), for the conveyance of workpiece carriers which are designed for instance as boxes to accommodate packagings for liquids. The track (3) has two straight portions (3a, 3b). So that it is possible without any cumbersome dismantling work to clean such an installation thoroughly while at the same time providing accurate guidance for the workpieces being conveyed, positioning them precisely at the processing stations, it is according to the invention proposed that the track (3) comprise, closed in itself, a row of links (4) which have their end faces (16) bearing one on another and in which there are recesses for engagement with the guide rails (1, 1', 2) which support the links (4) in the straight portions (3a, 3b) from opposite sides and in the curved portions (3c, 3d) from outside and in that one workpiece carrier is inseparably mounted on each link (4).

9 Claims, 9 Drawing Sheets

Fig.12 (XII-XII)

CONVEYOR INSTALLATION FOR WORKPIECE CARRIERS

The invention relates to a conveyor installation with a track driven to run endlessly about two deflector wheels and supported by means of guide rails, for the conveyance of workpiece carriers, the track having two straight and two curved portions.

Conveyor installations of this type are already known, for instance in the case of machines for producing packages for liquids where a synthetic plastics toothed belt runs endlessly about two deflector wheels which have vertical axes of rotation and on which workpiece carriers are attached. The use of synthetic plastics toothed belts has the disadvantage that by reason of the pull of the drive wheel which is disposed at the front in the direction of conveyance the belt becomes lengthened and so positioning of the individual workpiece carriers are desired locations is not accomplished with sufficient accuracy and precision. A conveyor installation of this type is in fact readily used for accommodating in the conveyor installation packages which are open at one end, carrying them to further processing stations. For example, it is intended that the packages should be filled, sealed, transferred to outer packages, for which purpose the packages have to occupy a precise positioning in the relevant processing station.

There are already conveyor installations which work on the principle of a bicycle chain, where an endlessly moving line of chain links rotate about two deflector wheels having horizontally disposed axes of rotation. On such conveyor installations, the packages were set up and without package carriers they were raised and lowered again in a filling station to a position below a filler pipe. Here, similarly, positioning problems occurred, which was a disadvantage, and it even happened that packages were tipped over since they had been temporarily removed from their supports.

Common to all the prior art conveyor installations was the disadvantage that it was difficult to clean the transporter means. For example, such conveyor installations were used for the packaging of milk and if milk finds its way between the joints in the conveyor installation, then as a result of bacterial action, time and temperature mean that it tends to constitute substantial contamination, which in turn results in problems of hygiene in packaging on a current basis. It is necessary for machines for producing filled packages of liquids to be cleaned at least once a day in order to satisfy the general hygiene conditions particularly with regard to the packaging of liquid foodstuffs (milk, juices, etc.). Where the prior art conveyor installations are concerned, there was no opportunity for cleaning certain areas of the conveyor installation without any dismantling being performed. On the other hand, the hygiene problem which is often invoked by legal requirements requires a cumbersome removal of parts or the at least partial dismantling of the conveyor installation.

Therefore, the object of the invention is to provide a conveyor installation of the type mentioned at the outset with which satisfactory cleaning is possible without any cumbersome dismantling operations, with at the same time the facility of accurately guiding the conveyed workpieces and of precisely positioning them in the machining stations.

According to the invention, this problem is resolved in that the track comprises, closed in itself, a row of links which have their end faces bearing one on another and in which there are recesses for engagement with the guide rails, which support the links in the straight portions from opposite sides and in the curved portions from outside, and in that at least one workpiece carrier is inseparably mounted on each link. Surprisingly, the links of the track are no longer connected to one another via a chain or a belt but only bear on one another so that they can be suitable means at positions envisaged for the purpose be withdrawn from the track and incorporated again therein without the need for the slightest dismantling by unscrewing, removal of pins or the like. What is particularly advantageous according to the invention is moreover the fact that it is not even necessary to remove one link from the track in order to perform the required cleaning. Instead, the conveyor installation according to the invention is so constructed that on its way through the endless track, i.e. through the straight and curved portions, is released at least once during the rotation through 360° and so has all its surfaces exposed for instance to the action of cleaning agents. Without the slightest cost of dismantling, the entire conveyor installation and in particular its links can after use, e.g. after an eight-hour day of working, be cleaned by cleaning agent sprayed from nozzles, even while the conveyor installation is running empty, because every surface of the conveyor installation is accessible to the spray jets at some location on the endless track. Even recesses, depressions or holes which pass completely through the relevant link will at some point on the per se closed path be exposed to the outside, so that for instance the action of spray jets can ensure perfect cleaning.

Together with the links, also the workpiece carriers are cleaned because they are rigidly mounted on the links, preferably one workpiece carrier on one link or in the case of another preferred embodiment two workpiece carriers on one link, although a plurality of workpiece carriers may also be mounted on one link of the track.

It is furthermore advantageous according to the invention if each link in the track has on opposite sides and constructed at least as partial grooves recesses which extend in the longitudinal direction of transport and, extending transversely to the longitudinal direction, end faces at the front and rear ends which are in some cases flat and in some cases curved and in that a bore traverses the link in a transverse direction, each link having on the inside which is towards the deflector wheels a recess extending in the longitudinal direction and which is adapted to engage over the deflector wheels, this recess being traversed by the bore.

If only adjacently disposed links of a track are used which are not fixed to one another, then supporting means must be provided while the links are travelling through the conveyor installation. These supporting means are the aforesaid guide rails which, when the aforesaid features are applied, are capable of sliding in housings which extend in the longitudinal direction of the relevant link. Such recesses may take the form of grooves with two side walls and a bottom, i.e. in cross-section they will substantially assume the shape of a U. Understandably, however, it is sufficient for the recesses to be of L-shaped cross-section, i.e. if one arm of the U is missing, because the other arm is sufficient as an abutment for the guide rail which furthermore slides along the bottom of this recess so that perfect guidance is possible particularly if preferably two guide rails are used. The guide rails which extend in the longitudinal direction of transport therefore provide the path for the links which run in between and which are in sliding engagement with the rails. Whereas in a preferred example of embodiment the guide rails consist of metal, the links can be made from synthetic plastics material, for example an ultra-high molecular polyethane. It goes without saying that the links may however also be produced from other synthetic plastics materials and even from metals if the corresponding shaping ensures that during operation the conveyor installation is not subject to excessive wear and tear.

For the straight portion of the track of links, at least two straight guide rails are expedient, one in the region outside the links, i.e. directed away and outwards from the deflector wheels while the other guide rail is directed inwardly in other words towards the deflector wheels. According to expediency, there are in this respect various possibilities for a man skilled in the art, e.g. the provision of two guide rails on the outside and one on the inside or conversely two rails on the outside and two on the inside.

The situation is different in the curved portions where the links have to move around the deflector wheels. On the inside, i.e. facing the relevant deflector wheel, there is no need to provide guide rails because here the deflector wheel concerned takes over the job of supporting and guiding the links in the curved portion. In contrast, outwardly curved guide rails have to be provided in order constantly and accurately to guide along the curved portions and at the deflector wheels the links which are guided on and by the deflector wheels, so that they do not fall out radially.

The aforementioned bore which traverses the respective link in a transverse direction preferably serves to receive a fixing bolt by means of which the workpiece carriers can be mounted on one or on both sides of the link. It is in particular advantageous for such bolts to be disposed rigidly in the link with a snug fit because thus the outwardly free surfaces on which impurities or even bacteria may be deposited are reduced in area. However, one can also imagine other embodiments which have bolts extending through the transverse bores and which are adapted for movement in respect of the link.

A further advantage of the bore with the bolt which it houses in the relevant link resides in that the teeth of the relevant deflector wheel are able to engage the bolts for guidance and possibly driving. For this purpose, the link in accordance with the aforementioned feature comprises, extending in a longitudinal direction, the recess for engaging over the deflector wheels. In other words at least the peripheral zones with the teeth of the deflector wheels run somewhat farther into the relevant link in fact sufficiently to guarantee engagement of the bolt located through the transverse bore. This is already defined in that the bore traverses this recess particularly since the bore traverses the link in a direction which is cross-wise to the longitudinal direction of conveyance.

According to the invention, it is furthermore favourable if the outside dimensions of all links in the track are the same and if the bottom of at least one groove-like recess is curved about a transversely extending axis and if preferably at least one groove-like recess is of angular cross-section. To avoid the poor positioning potential, where the conveyor installation according to the invention is concerned, there is a departure from the synthetic plastics toothed belt. Instead, the track or line of links is in the afore-described manner and development so disposed that one deflector wheel takes over the drive and in particular pushes the line of links after leaving the curved portion and entering the straight portion. In this way, whichever is the leading link in the direction of transport is pushed by whichever is the link behind it, by contact through the end faces. This pushing ensures minimising of the distances between the links which it goes without saying are not compressible within the sense in consideration here and therefore can be in each case accurately positioned under the desired location. It goes without saying that both deflector wheels can be used for the drive and in fact, the leading deflector wheel in the direction of transport may provide the drive because the thrust is passed onto the endless belt by the track and also reproduced by the curvature of 180°. It is however more advantageous to use for the drive that deflector wheel which pushes the track of links into the upper straight run particularly since generally all the processing stations are disposed within its range.

The ensuing description explains how the longitudinally extending recess on the inside of the link can have a straight bottom in a transverse direction. However, in accordance with the last listing of advantageous features, it is preferable if the bottom of such a groove-like recess is curved on the inside of the link, i.e. towards the deflector wheel with a curvature which corresponds to the circumference of the deflector wheel. In this way, the link is supported in optimum fashion by the relevant deflector wheel, is deflected in the curved portion and is if necessary driven at the same time.

For exact pushing and positioning, it is necessary particularly for the length of all the links to be exactly the same in the direction of conveyance. Between in each case two successive links there is the end face which has an outwardly disposed first flat area. Along this and in succession in the transport direction links are provided in the straight run and are adjacent one another so that they exert a mutually pushing action on one another. At the same time, however, there is also a pushing in the curved portion and in fact over the curved areas of the end face, the relevant curved portion of the end face being directly adjacent whichever is the flat portion. The transition takes place along a straight line, i.e. the curved end face has only one curvature about an axis which is parallel with the axis of the deflector wheel. Thus, over this curved portion of the end face there is an accurately bearing contact, successive links in the track having a linear contact with one another. The pushing effect according to the invention is thus guaranteed.

In the straight run of the conveyor installation, the guide rails should be at least as long as in the straight portion or in the straight run. The same applies to whichever is the curved portion at each of the two ends of the straight portion. Preferably, the guide rails overlap at the transition between whichever is the straight portion and the relevant curved portion, in order to guarantee a smooth transition of the links carried by the guide rails out of one portion and into the other.

If the groove-like recess is of angular cross-section, this means that a more or less weakly rounded off corner is provided where the relevant arm of the U is connected to that web of the U which is connected to these portions or which merges into them. The advantage of such a cross-sectionally angled groove lies in the fact that tilting of the member to one side is avoided and in that expediently also the guide rod is of square cross-section and is preferably quadratic.

According to the invention, it is expedient to provide a gap between the link and the workpiece carrier which is fixed to it. This optional solution offers the advantage of better cleaning particularly if there is on one or both sides of the member (cross-wise to its longitudinal direction of transport) a workpiece carrier which is secured by means of a bolt which passes through the transverse bore and which is preferably and immovably fixed therein with a normal fit. The distance between the workpiece carrier and the relevant outside wall of the member (lateral plane) amounts to 1 to 10 mm and is preferably 2 to 8 mm. The surfaces disposed on both sides of this gap can therefore be cleaned more easily. When using the conveyor installation in a machine for packaging liquid foods, bacteria can no longer collect.

A particularly preferred embodiment of the invention is furthermore characterised in that the link has a plurality of groove-like recesses both on the outer as well as on the inner side which is towards the deflector wheels and in that there are in the straight portions of the line at least two straight guide rails and in that there are in the curved portions in each case at least one curved guide rail, the guide rails preferably overlapping one another in the transition zones. By such a plurality of guide rails, an easy, friction-free and yet accurate guidance of the otherwise just loosely adjacent elements can be guaranteed. In the transition areas, there is a very even phase of insertion of the links through the overlapping rails. At the same time, all the outer surfaces of the rails can be easily cleaned.

It was mentioned at the outset that known conveyor installations having the features of the type mentioned at the outset are also used for conveying unilaterally open empty packages to a filling station in which the packages are preferably raised to a point under a filling tube and are then slowly lowered during filling. The conveyor installation according to the invention can also be used for this purpose. The construction of the elements of the conveyor installation according to the invention and their disposition without reciprocal connection or without screwed connections with holding arrangements is suitable not only for satisfactory cleaning but also at the same time for use in a filling station. If for example it is intended for milk to be filled into a liquids-containing package, then it is necessary to see that the generally marked foaming connected therewith is avoided. Foaming is in particular avoidable in a per se known manner if the package which is open at the top has its bottom pushed sufficiently far over the pourer orifice of a filling station filler pipe disposed above the conveyor installation that the distance between the bottom and the extreme bottom end of the filler pipe is just a few millimeters or centimeters. If, then, the ejection of milk into the package starts, then the package ought to be fed into the line of links and thus workpiece carriers or packages at a speed such that the level of milk remains at substantially the same height, because this creates the least amount of turbulence and only very minimal foaming. For this, however, it is necessary for a package to be raised from the conveyor in a direction cross-wise to the direction of conveyance, generally vertically upwardly once it has been disengaged from the conveyor line. It will be appreciated that such a conveyor line can only be moved on intermittently and that lifting up the packages under the filler pipe can only be accomplished during a stationary phase.

The measures for raising a workpiece which is a package for fluids, in a preferred embodiment of the invention, requires either a release of the workpiece carrier from a chain link and movement of the workpiece carrier together with the package or—and this is the new idea according to the invention—the release of a link from the line of links together with the workpiece carrier attached to it, followed by raising, filling and return to the line. According to the invention, the features envisaged for this are characterised in that in the straight portion of the track, the guide rail is interrupted over the length of at least one link and in that a gripper part which is translatorily adjustable in a transverse direction comprises a longitudinal groove with which it is possible to engage a bottom tongue of the workpiece carrier and in that safety guide rods on the gripper part and extending in the same transverse direction are fixed via supporting arms. A guide arrangement which is constructed in this way permits the aforementioned measures in a particularly simple manner because no dismantling is necessary and the workpieces, e.g. empty packages for liquids, open at one end, can be held in the workpiece carriers and moved together with the links. The bottom of the relevant tool carrier is particularly suitable for application of a laterally projecting tongue having a longitudinal groove which can be engaged with a gripper part so that by such engagement lifting and lowering forces can be introduced in a precisely time-controlled manner. The workpiece carrier is so to speak controlled directly and the link indirectly via this gripper part. In other words, the necessary force is introduced into the link which as to be lifted out of the line via the workpiece carrier. Furthermore, in order to maintain the gap created by removing the link from the line and prevent adjacent links tumbling into the gap, the aforementioned safety guide rods are provided and are moved in a translatory fashion together with the translatory movement of the gripper part itself, in fact they are moved in the same transverse direction as the gripper part which, in the case of the preferred embodiment of a liquids package, they are therefore moved in a vertical direction for filling, in which case the longitudinal direction of line transport must be imagined as being horizontal.

Furthermore, the invention is developed in that the gripper part is fixed on a lifting rod adjustable in a translatory fashion and in a transverse direction and which can be driven by a servomotor, cam roller or the like and which is mounted on the frame of the conveyor installation. The aforesaid drive means provide for a precise movement which can be controlled not only in its timing but also in its location so that complicated operations can also be accomplished, these including the filling of liquid foodstuffs into packages.

The precise gripping of the adjacent links in the line when this is stationary, for lifting of one link with a tool carrier is possible in a particularly advantageous manner if, according to the invention, the distance between the safety guide rods corresponds to the length of one link in the track. For example, it is possible to mount on the said gripper part so-called bottom safety guide rods over the aforesaid supporting arms at a location which, when the conveyor track is viewed in plan, is disposed within the outer contours of the relevant link, the peripheries being tangent. Consequently, these lower safety guide rods are for practical purposes displaced along the boundaries of the gap in front of the adjacent links which can therefore be held precisely in the line. In addition and if necessary also upper safety guide rods, which are preferably stationary, can be fitted at the ends of the upper guide rods and in a transverse direction thereto so that also the link which has been lifted out of these upper safety guide rods remains precisely in position, without tilting. It is true that the gripper part anyway provides adequately for secure supporting of the disengaged link but if this isolated link is loaded by a plurality of workpiece carriers, the aforementioned rods can substantially improve guidance and simplify the overall structure.

It is furthermore advantageous according to the invention if the workpiece carrier takes the form of a box which is closed on the inside by a bottom and which is open on the outside. The shape of the box ought to correspond to the outward form of the workpiece which is to be carried. For example, it is possible to conceive of a tubular liquids package the tube of which may be circular or also rectangular on the outside. Accordingly, the tube of the box should likewise be outwardly circular or rectangular. In the case of a particularly preferred embodiment, the premise is a cross-sectionally square box but it might just as easily be a rectangular box. One wall of this box has a peg by which in the manner described above it is fitted into the transverse bore in the link, the box having to be open at the top while its lower end comprises the bottom with the aforesaid bottom tongue. "Lower" or "bottom" denote that direction of the conveyor installation according to the invention which faces the deflector wheels while "upper" or "top " denote the opposite direction, both direction being regarded as vertical. The disposition of the bottom tongue underneath permits of a shorter arrangement for raising the gripper part because the vertical distances are shortened thereby. The bottom tongue preferably projects in a direction which is imagined as being for example horizontal, in a direction transverse to the direction of longitudinal conveyance and preferably away from that surface which is on the same side as the peg, in relation to the longitudinal central axis through the workpiece carrier. Therefore, whereas the bottom tongue extends in one direction in relation to the longitudinal central axis through the workpiece carrier, the side wall or a supporting panel of the workpiece carrier for fitment on the peg and on the link of the conveyor installation is disposed on the opposite side.

The afore-described conveyor installation is particularly suitable for the transporting of tubular packages which are open at one end and which are intended to hold flowable media, in a machine for producing an/or filling and/or sealing such packages. Thus, many advantages can be achieved, in some cases even simultaneously, with such packaging machines, advantages which can only be incompletely, individually or perhaps not at all achieved by prior art conveyor means.

Further advantages, features and possible applications of the present invention will emerge from the ensuing description of preferred examples of embodiment, in conjunction with the attached drawings, in which.

Figure 1:
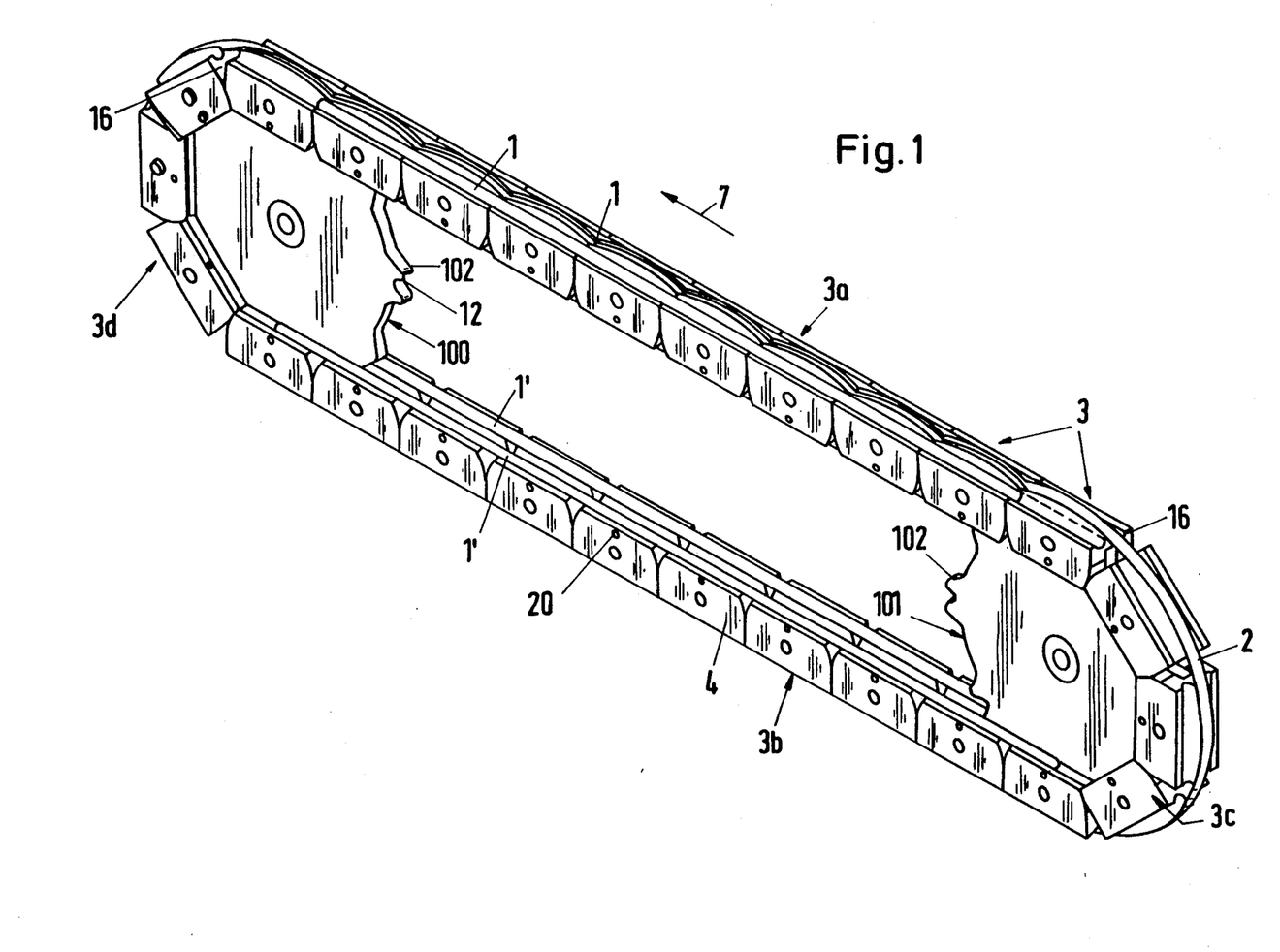
FIG. 1 is a perspective view of the conveyor installation with the links supported by the guide rails and with two deflector wheels, but without workpiece carriers.
Figure 9:
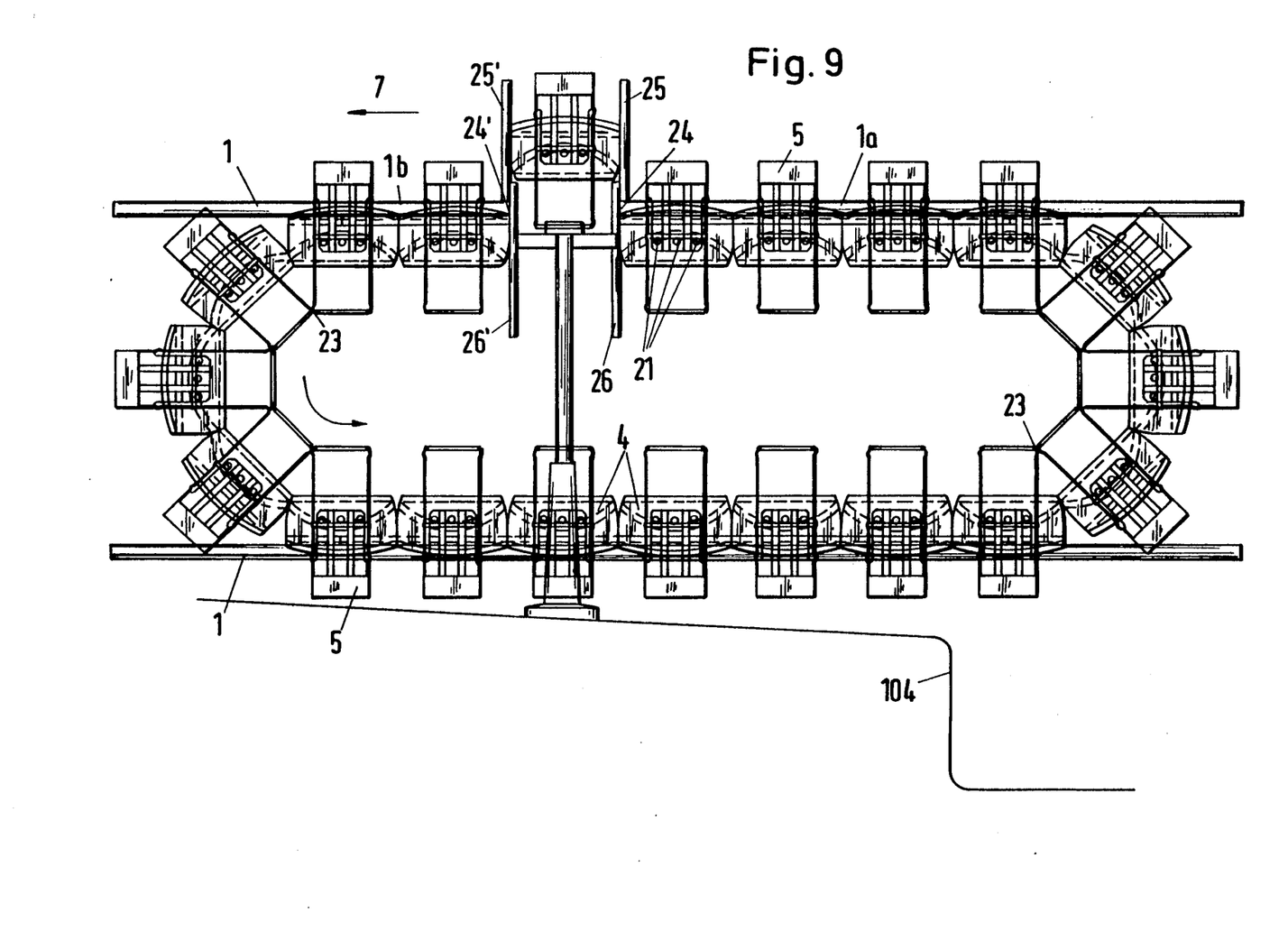
FIG. 9 shows a conveyor installation similar to that in FIG. 8 but in which the workpiece carriers are fitted and in which, at one location, a link with a workpiece carrier is shown as having been lifted out of the line by a lifting rod.

The conveyor installation shown without workpiece carriers in FIG. 1 comprises a track generally designated 3, driven to run endlessly about two deflector wheels 100, 101 and supported by means of guide rails 1, 1', 2, the track having links 4 for the guidance of workpiece carriers 5 which are only shown in FIGS. 9 et sequ. The track 3 has an upper straight portion 3', a lower straight portion 3b, a right-hand curved portion 3c and a left-hand (all as seen in FIG. 1) curved portion 3d.

FIG. 1 shows how an endless track 3 or line of links 4 have their end faces 16 bearing on and pushing against one another. For example, if the front right deflector wheel 101 is the gear wheel having teeth 102 and is driven about its horizontal axis of rotation, then the direction of transport of the links 4 in the region of the upper straight portion 3a will be assumed to be that shown in FIG. 1, from right front to left rear in the direction of the arrow 7. Therefore, the direction of transport lies in the direction of this straight arrow 7. The links 4 which are in front in the transport direction 7 are therefore being pushed along by those behind and which are disposed farther to the right in FIG. 1, because the right-hand deflector wheel 101 rotates in an anti-clockwise direction.

In the straight portions, at the outsides, i.e. away from the deflector wheels 100, 101, there are two straight guide rails 1 and on the insides there are two further straight guide rails 1' which can be seen particularly clearly at the bottom strand in FIG. 1. In the curved portions 3c and 3d it is only on the outside that there is one single curved guide rail 2 because on the insides the links 4 are supported and guided by the relevant deflector wheels 100, 101.

Figure 8:
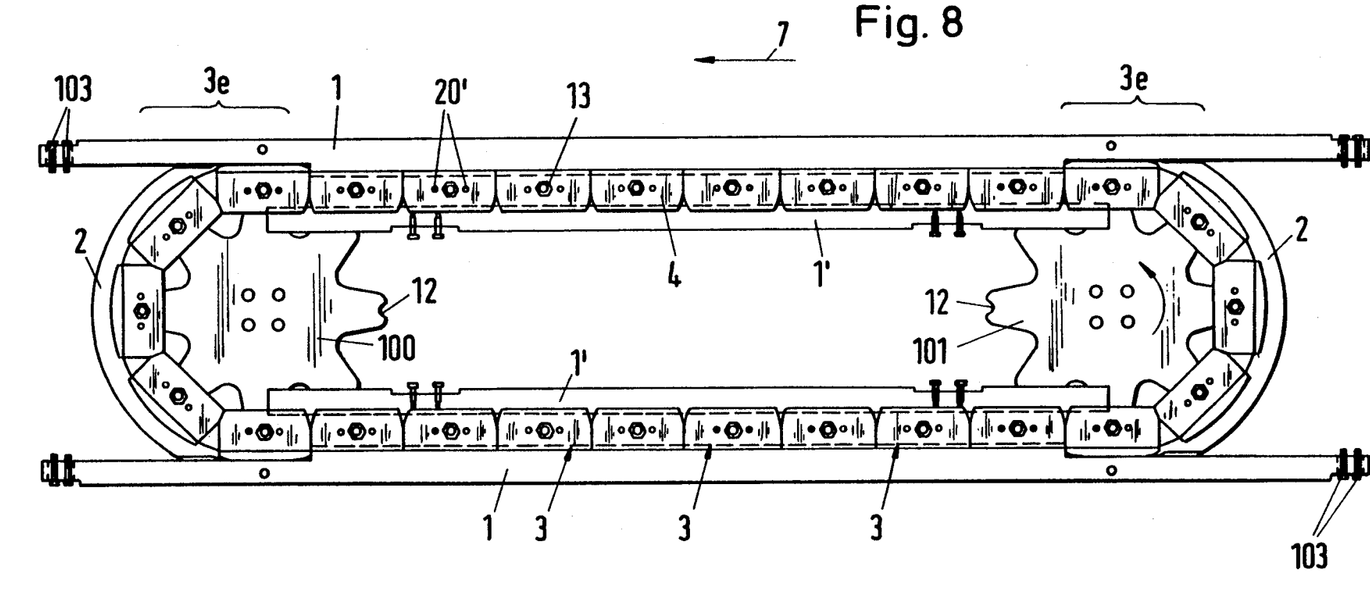
FIG. 8 is a side view of the conveyor installation in another embodiment than that shown in FIG. 1, with deflector wheels but without workpiece carriers, FIG. 8' is a cross-sectional view of the upper and lower straight guide rails respectively.

FIGS. 8 and 9 likewise show the conveyor installation from the side, the deflector wheels 100, 101 in FIG. 8 being of a somewhat different construction and being shown only diagrammatically in FIG. 9. The drawings show upper and lower straight guide rails 1, the cross-sectional form of which is shown in FIG. 8'. They are cross-sectionally elongate with rounded top and bottom edges which enter into a sliding engagement with the links 4 and they are longer than the length of the straight portion of the track or line 3 of links 4. In the transition zones designated 3e, the straight guide rails 1 are overlapped by curved guide rails 2 (in FIG. 9, these curved guide rails are not shown). Pairs of screws 103 provide for fixing of the guide rails 1 on the (not shown) supports of the machine frame 104.

For better understanding of the further embodiments, reference will first be made to a first embodiment of a link 4 of the line shown in FIGS. 2 to 5. Generally, the link 4 is shown in a perspective view in FIG. 2 and has three side views shown in FIGS. 3, 4 and 5. The longitudinal direction of transport is again indicated by the arrow 7 in FIGS. 2 and 5. It will be seen that the link 4 is in the form of a parallelpiped block which is longer in the longitudinal direction of transport 7 than it is in a transverse direction, as indicated by the arrow 8 in FIGS. 2 and 4. Whereas the line 3 extends horizontally in the longitudinal direction 7 for example, the transverse direction 8 is likewise horizontal as is also the bore 9 which traverses the link 4 in a transverse direction 8.

The length 1 of a link 4 in a preferred embodiment amounts to 150 mm while its width b is 70 mm as is also its height h. This height h is measured between two straight longitudinal edges on the outside of the link 4, a slot-like recess 10 which is curved with two side cheeks 10a and 10b extends on the upper outer surface, in the centre, in the longitudinal direction of transport 7, so that a dimension of about 90 mm results over the total height H.

The bore 9 traverses the link 4 in a traverse direction 8 to about half its height so that the bore 9 also passes through a lower recess 11 which extends in the longitudinal direction of transport 7. The recess 11 is, when the link 4 is installed in the line, disposed on the inner side which is towards the deflector wheels 100, 101. It can be seen particularly clearly from FIGS. 1 and 8 how the teeth 102 of the deflector wheels 100, 101 are accommodated in or pass through this recess 11, so that the link 4, by means of its recess 11, virtually engages over the deflector wheels 100, 101. The reason why this bottom recess 11 is traversed by the bore 9 is the drive, because the depression 12 provided in the tooth 102 of the relevant deflector wheel 100, 101 and shown in FIGS. 1 and 8 engages around the pin 13 shown in FIG. 8 and which is firmly press-fitted in the bore 9. Thus, via the right-hand deflector wheel 101, each of the five links 4 present in the curved portion 3c is driven and exerts a pushing effect on the links 4 which are in front of it in the direction of transport 7, so that there is no need to fear any elongation of the track even when relatively high thrust forces are introduced into it.

Figure 2:
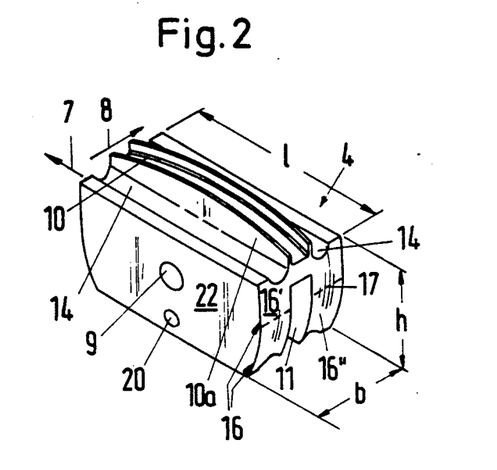
FIG. 2 is a perspective view of a first embodiment of track link.
Figure 3:
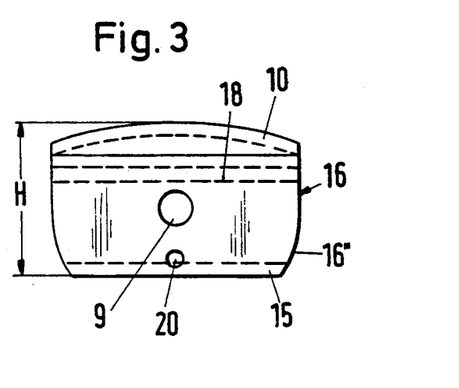
FIG. 3 is a side view of the link in FIG. 2, in a direction cross-wise to the longitudinal direction of conveyance.
Figure 4:
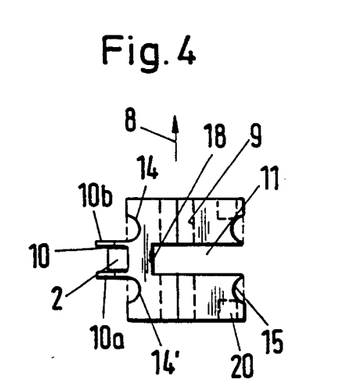
FIG. 4 is a plan view of the link in FIG. 2, viewed from the front right.
Figure 5:
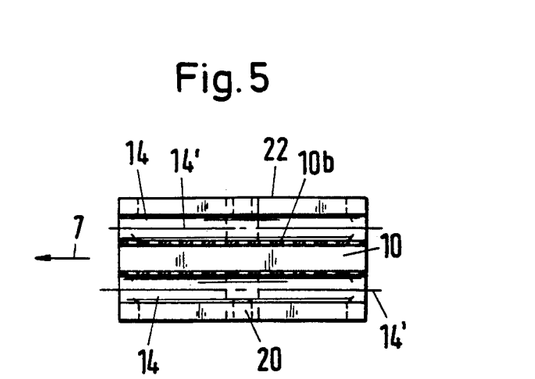
FIG. 5 is a plan view of the link, FIG. 2' is a perspective view of another embodiment of a link, FIG. 3' is a side view in the transverse direction of the continuous bore, FIG. 4' is a view of the end face of the link viewed from the right front, in the longitudinal direction of transport in FIG. 2', FIG. 5' is a cross-sectional view taken on the line V'—V' according to FIGS. 6 and 7.
Figure 6:
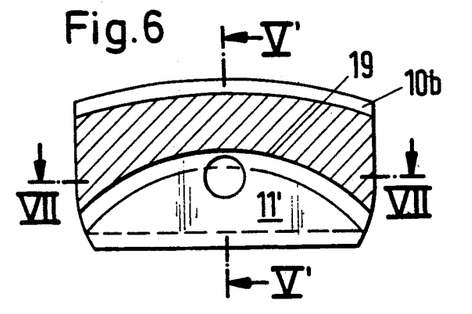
FIG. 6 is a longitudinal sectional view taken on the line VI—VI in FIG. 5'.
Figure 7:
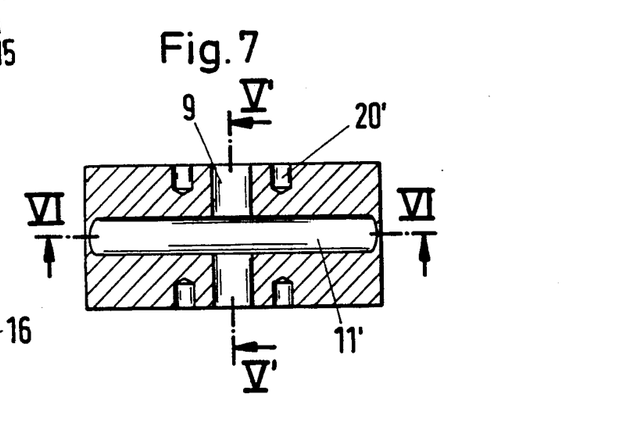
FIG. 7 is a cross-sectional view taken on the line VII—VII in FIG. 6.

Both in the embodiment shown in FIGS. 2 to 5 and also in that shown in FIGS. 2' to 5', 6 and 7, the link 4 has grooves 10, 14 extending in the longitudinal direction 7 on the upper surface, the middle groove 10 of angular cross-section being enclosed on both sides of the cheeks 10a, 10b by upper lateral grooves 14, the bottom 14' of which is straight and has in cross-section a substantially regular curvature. This bottom 14 is indicated in FIG. 5 by a straight line and in FIGS. 4' and 5' by a zig-zag line 14'.

On the opposite and lower side extend three parallel recesses 11, 15, the deep middle recess 11 already having been referred to and being enclosed on the outside by two shallower grooves 15.

In the case of the first embodiment shown in FIGS. 2 to 5, the upper middle recess 10 is envisaged as being for sliding engagement of the curved guide rail 2 which is shown as having a square cross-section in FIG. 4. The two outer upper grooves 14 serve for sliding engagement with the straight guide rails 1 which extend parallel over the entire straight portion 3a, 3b.

The middle deep recess 11 is intended to engage around and receive the periphery of the deflector wheels 100, 101, at the same time the pin 13 in the bore 9 so extending freely in this deep recess 11 that the teeth 102 can be brought into guiding and/or driving engagement with the pin 13. The outer lower shallower grooves 15 again serve for sliding engagement with the inner guide rails 1' in the region of the straight portions 3a and 3b. In this way, the link 4 can be precisely guided by the guide rail described.

At the leading and trailing ends, each link 4 is provided with an end face 16 which has a flat surface 16' above the broken line 17 (FIG. 2) adjacent to which there is a curved surface 16' below the straight line 17. In the straight portion 3a, 3b of the track 3, one link 4 pushes whichever is the other via the flat end face 16' and in the curved portions 3c, 3d, reciprocal pushing takes place along a linear contact between the curved end faces 16".

The link 4 in the second embodiment is constructed in a very similar manner and is shown in FIGS. 2' to 5', 6 and 7. The most substantial difference resides in the construction of the deep recess 11' which does not extend as in the first embodiment along the broken line 18 in the longitudinal direction 7 evenly and straight from front to rear but instead extends along the line 19 through an arc from front to rear. The axis of curvature of this arc extends in a transverse direction 8 and lies approximately in the axis of rotation of the deflector wheels 100, 101, so that the teeth 102 as they move through this deep recess 11' are able to move through it easily. It will be understood that the depression 12 in each tooth 102 is fixed in relation to the bore 9 because the pin 13 lies in it. This second embodiment provides a somewhat stronger link 4 because it is not comparatively weakened in the middle by the deep recess 11.

The fact that the flat end faces 16' are disposed more towards the outside and the fact of the curved end faces 16" of the links can best be appreciated from FIG. 8 which shows the pushing function of the line of links. In addition to the main bore 9 which traverses the link 4 in a transverse direction 8 and serves as a housing for the pin 13 for driving engagement on the one hand and for fixing the workpiece carriers 5 on the other, there is in the first embodiment of link 4, according to FIGS. 2 to 5, an additional blind bore 20 which, like the two blind bores 20' provided on either side of the bore 9, in the embodiment shown in FIGS. 2'to 5', 6 to 8, serve to support the workpiece carrier 5 so that it is fixed for example against rotation about an axis in the transverse direction 8 of the link 4.

FIGS. 9 et sequ. show the workpiece carrier 5 as fixed on the link 4. By means of screws not shown, the workpiece carriers 5 can be fixed via the bores 21 on the link 4 and at a distance from its flat side walls 22. With regard to the curved portions 3c and 3d of the track 3, their size is such that they do not quite touch the points designated 23 in FIG. 9, which guarantees perfect running of the track or line 3.

Figure 10:
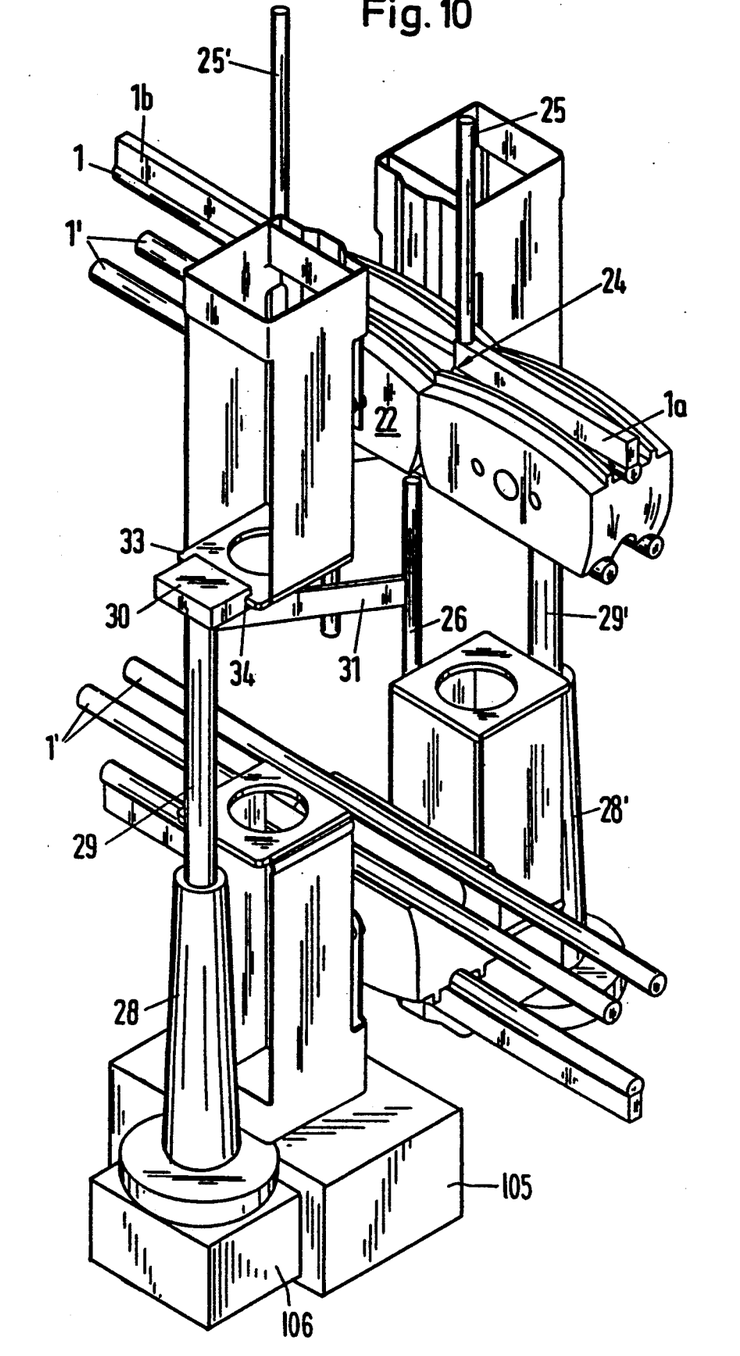
FIG. 10 is a perspective broken-away view of a portion of that part of the conveyor installation in which the upper guide rails are interrupted and with workpiece carrier disposed on both sides of the link.
Figure 11:
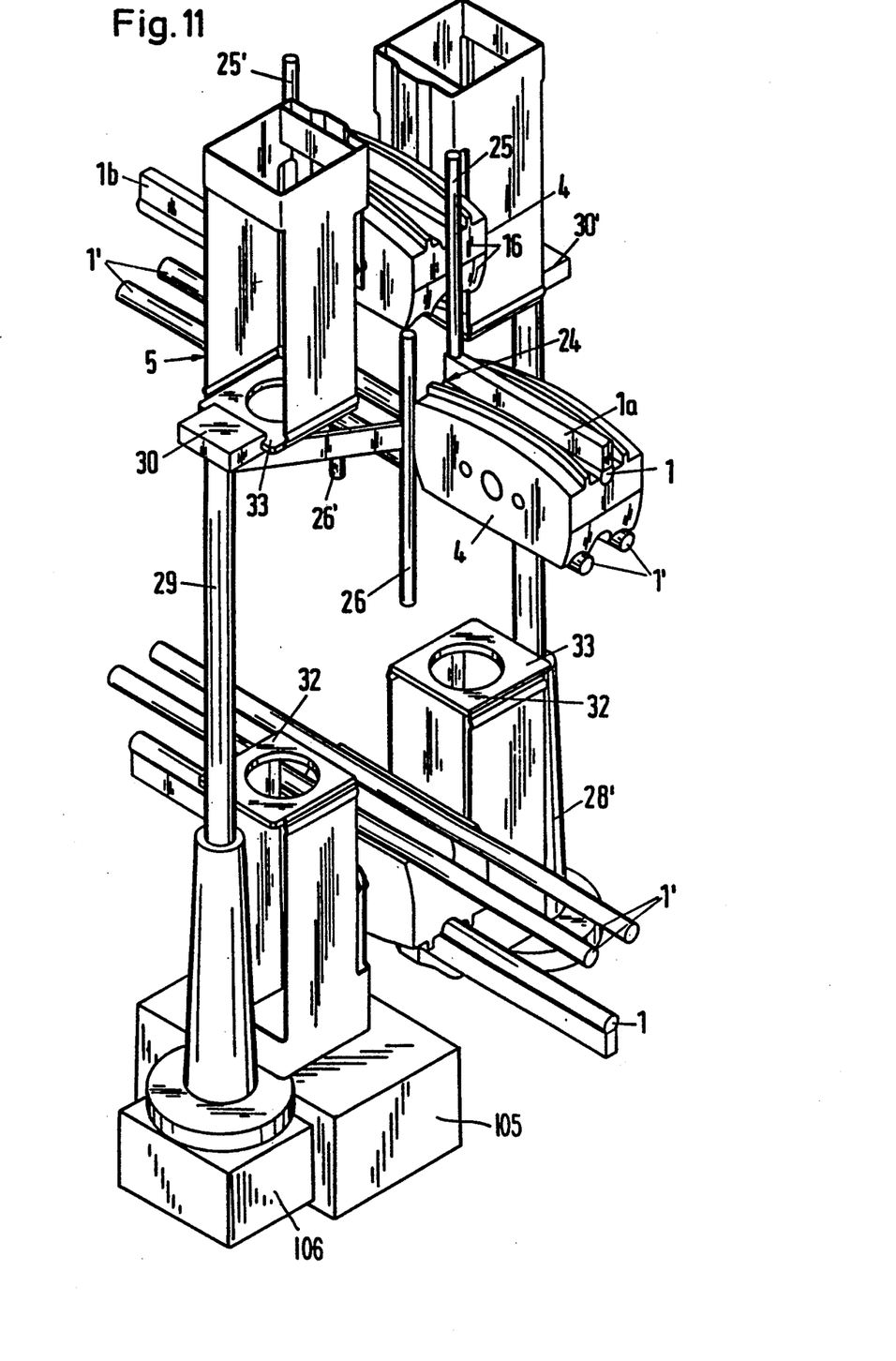
FIG. 11 is a similar view to that in FIG. 10 but in which a link with two workpiece carriers is shown as lifted out of the upper line of links.
Figure 12:
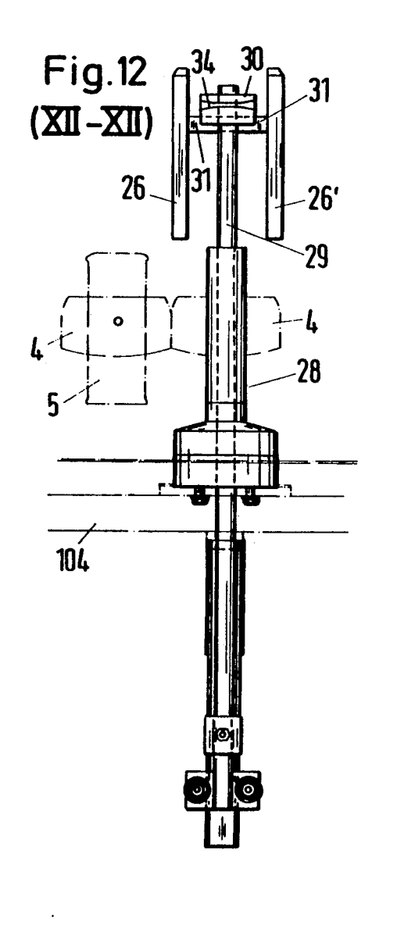
FIG. 12 is a broken-away side view taken on the line XII—XII in FIG. 13 to show a link being lifted out of the line.
Figure 13:
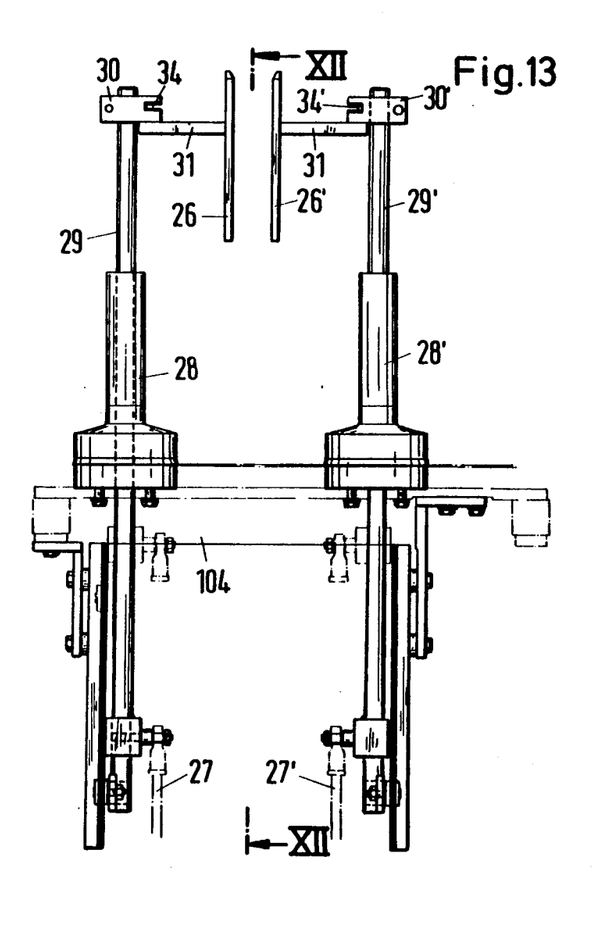
FIG. 13 is a view of the lifting arrangement in the longitudinal direction of transport.
Figures 14, 15, 18:
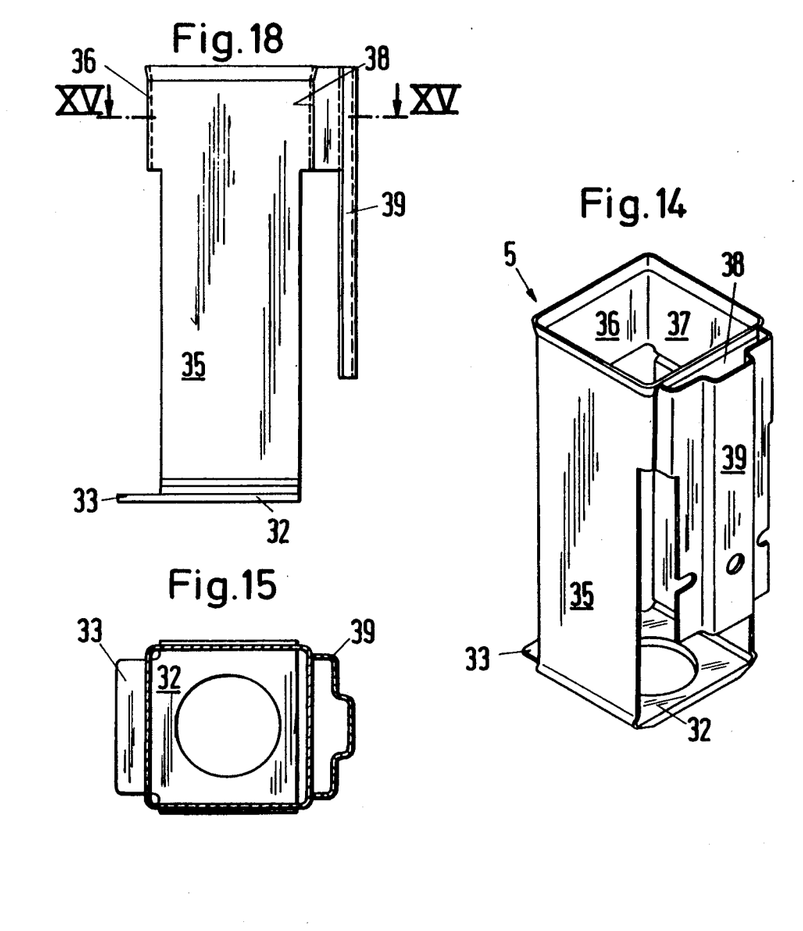
FIG. 14 is a perspective view of a workpiece carrier.
FIG. 15 is a cross-sectional view of the workpiece carrier taken on the line XV—XV in FIG. 18.
FIG. 18 is a side view in the longitudinal direction of transport when one is looking from left front to right rear in the view in FIG. 14.
Figure 16:
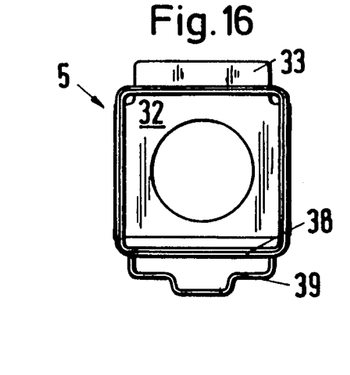
FIG. 16 is a plan view of the workpiece carrier in FIG. 14.
Figure 17:
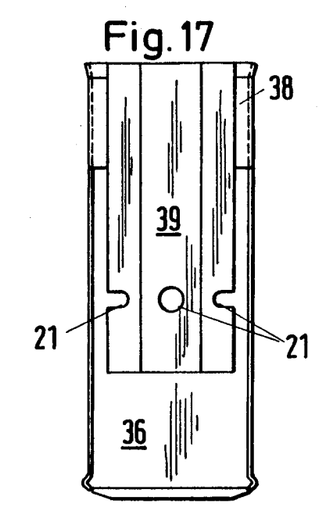
FIG. 17 is a side view of the workpiece carrier viewed from within when one is looking from right front to left rear in FIG. 14

The outer guide rails 1 in the upper straight portion 3a or even just one straight guide rail 1 is/are interrupted at the position shown in the top centre in FIG. 9, this interruption being more clearly seen in the perspective views in FIGS. 10 and 11. These show at the outside just one guide rail 1 whereas both in the upper and also in the lower straight portions 3a, 3b, there are on the inside in each case two straight guide rails 1'. Of course, it is sufficient for just the outer upper guide rail 1 to be discontinued at the location 24. The opposite side (on the left in FIGS. 10 and 11) is only visible in FIG. 9 and is designated 24'. The space between these locations 24, 24' corresponds in its length to the length 1 of a link 4 so that according to the view in FIG. 9, the inner surface of an upper safety guide rod 25, 25' is flush with the end faces 16 and on the end face of the two links 4 remaining in the track 3 and which are adjacent the gap, so-called lower safety guide rods 26, 26' come to bear with their outsides in contact.

FIGS. 10, 11, 12 and 13 illustrate the entire lifting arrangement, the drive of which is disposed on or beneath the generally horizontally disposed frame 104. By means of guide rods 27, 27', lifting rods 29, 29' guided in guide sleeves 28, 28' are raised and lowered by a servomotor 105 and gear 106 or control cams not shown in the drawings but disposed right at the bottom, via a gripper part 30, 30' disposed on their vertically upper free end. Via support arms 31, lifting rods 29, 29' carry the lower safety guide rods 26, 26' which move jointly with the gripper part 30, 30' with the lifting rod 29, 29'.

On the other hand, the upper safety guide rods 25, 25' are stationary as can be clearly seen in FIGS. 10 and 11, and they are fixed on rail reinforcements 1a and 1b. These upper safety guide rods 25, 25' are not absolutely necessary but they serve to avoid the disengaged and lifted link 4 tilting. In fact, this link has its flat end face 16' bearing with linear contact against the upper safety guide rod 25, 25' by which it is guided. Mounted on the flat side face 22 of the relevant link 4 and at a distance therefrom are the workpiece carriers generally designated 5 so that a rigid unit is formed which consists of the left-hand workpiece carrier, connected to an intermediately disposed link 4, and a right-hand workpiece carrier 5. At the discontinuance or interruption in the outer guide rail 1, this unit would cease to be guided at the locations 24, 24' were not the bottom 32 to have a bottom tongue 33 protruding from the side which points away from the track 3 and which can engage into a groove 34, 34' in the gripper part 30, 30' as is shown in such engagement in FIGS. 9 to 11. The function of the missing guide rail 1 is taken over by the gripper part 30, 30' through which the lifting and supporting force is initiated from both sides, also the link 4 mounted in between is also controlled.

The workpiece carrier is shown in FIGS. 14 to 18. It consists of four flat side walls 35, 36, 37, 38 connected to one another along edges extending along the resultant tube and of which the surface 38 which is towards the track 3 is subdivided into a shorter upper wall and adjacent thereto a supporting panel 39 provided farther down and which projects to one side, namely towards the track 3, and from the side wall 38 by approximately the same amount as the bottom 32 projects downwardly to the opposite side, in the form of the bottom tongue 33. The hole shown in the bottom 32 serves on the one hand as a means of saving on material and weight but it also serves to reduce the surface area on which bacteria might collect. Furthermore, it is also easier to spray cleansing agents or even introduce tools through this hole in order to carry out work inside the workpiece holder 5. At the holes 31 in the supporting plate 39, the workpiece carriers 5 are fixed to the relevant link 4, for example by means of bolts, and they are fixed at a distance of for example 5 mm so that all surfaces are clearly opposite the jets of sprayed cleansing agent.

| List of reference numerals | |
| --- | --- |
| 1, 1', 2 | Guide rails |
| 1a, 1b | Rail reinforcements |
| 3 | Track or line |
| 3a | Upper straight portion |
| 3b | Lower straight portion |
| 3c | Right-hand curved portion |
| 3d | Left-hand curved portion |
| 3e | Transition zones |
| 4 | Links |
| 5 | Workpiece carrier |
| 6 | End faces |
| 7 | Arrow, longitudinal direction of transport |
| 8 | Arrow, transverse direction |
| 9 | Bore |
| 10 | Groove-like recess |
| 10a | Side cheek |
| 10b | Side cheek |
| 11 | Recess |
| 11 | Deep recess |
| 12 | Depression |
| 13 | Pin |
| 14 | Groove |
| 14' | Groove bottom, intersection |
| 15 | Recess, groove |
| 16 | End face |
| 16' | Flat face |
| 16" | Curved face |
| 17 | Broken line |
| 18 | Broken line |
| 19 | Line |
| 20, 20' | Lined bore |
| 21 | Bores |
| 22 | Flat side walls |
| 23 | Points |
| 24 | Location |
| 24' | Opposite side |
| 25, 25' | Upper safety guide rods |
| 26, 26' | Lower safety guide rods |
| 27, 27' | Drive rods |
| 28, 28' | Guide sleeves |
| 29, 29' | Lifting rods |
| 30, 30' | Gripper part |
| 31 | Supporting arms |

-continued

| List of reference numerals | |
| --- | --- |
| 32 | Bottom |
| 33 | Bottom tongue |
| 34, 34' | Groove |
| 35 | Side wall |
| 36 | Side wall |
| 37 | Side wall |
| 38 | Side wall |
| 39 | Supporting plate |
| 100, 101 | Deflector wheels |
| 102 | Teeth |
| 103 | Pairs of screws |
| 104 | Machine frame |
| l | Length of a link |
| b | Width of a link |
| h | Height of a link |
| H | Overall height |

We claim:

1. A conveyor installation with a track driven to run endlessly about two deflector wheels and supported by means of guide rails for the conveyance of workpiece carriers, the track having two straight and two curved portions, characterised in that the track comprises, closed in itself, a row of links which have their end faces bearing one on another and in which there are recesses for engagement with the guide rails which support the links in the straight portions from opposite sides and in the curved portions from outside, and in that at least one workpiece carrier is fixedly mounted on each link.

2. A conveyor installation according to claim 1, characterised in that each link of the track has on opposite sides as partial groves, recesses extending in the longitudinal direction of conveyance and at the front and rear ends end faces extending transversely to the longitudinal direction and which are partially flat and partially curved, and in that a bore traverses the link in the transverse direction and in that each link has on the inside face which is towards the deflector wheels and extending in the longitudinal direction a recess to engage over the deflector wheels, this recess being traversed by the bore.

3. A conveyor installation according to claim 1 or 2, characterised in that the overall dimensions of all links of the track are identical and in that the bottom of at least one recess is curved about an axis extending in a transverse direction and in that preferably at least one recess is of angular cross-section.

4. A conveyor installation according to any one of claims 1 or 2, characterised in that there is a gap provided between the link and the workpiece carrier attached to it.

5. A conveyor installation according to any one of claims 1 or 2, characterised in that the link has both on the outer and also on the inner surface which is towards the deflector wheels, a plurality of recesses and in that in the straight portions of the track there are at least two straight guide rails while there are in the curved portions in each case at least one curved guide rail, the guide rails preferably overlapping in transition zones.

6. A conveyor installation according to any one of claims 1 or 2, characterised in that in the straight portion of the track, the guide rail is interrupted over the length of at least one link and in that a gripper part which is translatorily adjustable in a transverse direction comprises a longitudinal groove with which it is possible to engage a bottom tongue of the workpiece carrier and in that safety guide rods on the gripper part and extending in the same transverse direction are fixed via supporting arms.

7. A conveyor installation according to claim 6, characterised in that the gripper part is fixed on a lifting rod adjustable in a translatory fashion and in a transverse direction and which can be driven by a servomotor which is mounted on the frame of the conveyor installation.

8. A conveyor installation according to claim 6, characterised in that the distance between the safety guide rods corresponds to the length of one link of the track.

9. A conveyor installation according to any one of claims 1 or 2, characterised in that the workpiece carrier takes the form of a box which is open on the outside and which on the inside is closed off by a bottom.

* * * * *